United States Patent

Cornell, Jr. et al.

[11] Patent Number: 5,588,248
[45] Date of Patent: Dec. 31, 1996

[54] FISHING WEIGHT

[76] Inventors: Thomas W. Cornell, Jr.; John L. Reinbold, both of c/o C. R. Steel 377 41 St., Lindenhurst, N.Y. 11757

[21] Appl. No.: 420,583

[22] Filed: Apr. 11, 1995

Related U.S. Application Data

[63] Continuation of Ser. No. 84,614, Jul. 1, 1993, abandoned.

[51] Int. Cl.$^6$ .................................................. A01K 97/02
[52] U.S. Cl. ................................................ 43/44.9; 43/43.1
[58] Field of Search ........................... 43/44.9, 43.1, 43/42.39, 42.45, 42

[56] References Cited

U.S. PATENT DOCUMENTS

| | | | |
|---|---|---|---|
| 3,641,698 | 2/1972 | Varaney | 43/42.48 |
| 3,769,740 | 11/1973 | Lang | 43/44.99 |
| 3,929,514 | 12/1975 | Houlihan | 148/6.14 |
| 5,020,265 | 6/1991 | Nuckols | 43/42.39 |
| 5,034,283 | 7/1991 | Lhymn | 428/614 |
| 5,131,670 | 7/1992 | Clements | 248/128 |
| 5,223,562 | 6/1993 | Sagawa | 524/275 |
| 5,248,400 | 9/1993 | Franks | 204/181.1 |
| 5,250,634 | 10/1993 | Toyoda | 525/438 |

*Primary Examiner*—Scott A. Smith
*Assistant Examiner*—James Miner
*Attorney, Agent, or Firm*—Joseph J. Previto

[57] ABSTRACT

A fishing weight having an outer surface. The fishing weight is formed from a zinc alloy which is environmentally safe. It has a protective coating covering the entire outer surface. The covering is non-corrosive when exposed to water so that if it is chipped or broken, the environmentally safe zinc alloy of the weigh will not contaminate the environment.

3 Claims, 1 Drawing Sheet

FISHING WEIGHT

This application is a continuation of U.S. application Ser. No. 08/084,614, filed Jul. 1, 1993, now abandoned.

BACKGROUND

The present invention relates to a fishing weight and, more particularly, to an environmentally safe fishing weight.

For many years fishing weights have been made of lead. They are made in various sizes such as one ounce, two ounces, etc., and are used to prevent fishing lines, hooks, and nets from floating on the top of the water. The weights cause the lines, hooks, and nets to remain below the water surface. The weights often drop to the bottom of the sea.

There exists a real danger of lead poisoning and/or contamination due to handling and use of such lead fishing weights and the proximity of lead weights to fishing tackle and caught fish. There also exists the danger of lead contamination in the water due to lost lead weights. Fishermen frequently handle lead weights and their catch with lead contaminated hands, or will eat hand-held food (sandwiches, etc.) with lead contaminated hands. In addition, lead fishing weights stored around the house, in basements or sheds, are a health hazard to children who will find and play with them or put them to their mouth.

Applying a protective coating onto lead fishing weights will reduce the dangers of lead contamination temporarily. However, any damage to the coating, which is bound to occur with usage, will expose the bare lead and endanger both the user and the environment because of lead contamination.

OBJECTS

The present invention overcomes these drawbacks and has for one of its objects an improved fishing weight which poses no danger of lead contamination.

Another object of the present invention is the provision of an improved fishing weight which is environmentally safe.

Another object of the present invention is the provision of an improved fishing weight which may be easily coated with a protective coating.

Another object of the present invention is the provision of an improved fishing weight which will not violate the environment even if its coating is chipped or cracked.

Other and further objects of the invention will be obvious upon an understanding of the illustrative embodiment about to be described or will be indicated in the appended claims, and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification wherein.

DESCRIPTION

Figure 1:
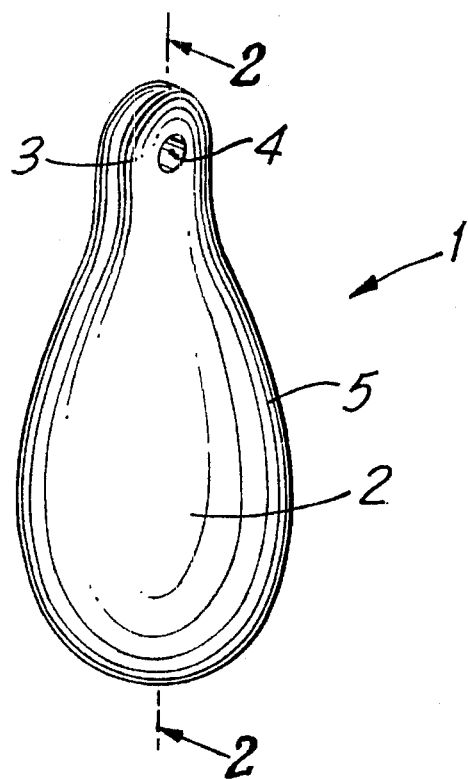
FIG. 1 is a perspective view showing a fishing weight made in accordance with the present invention.
Figure 2:
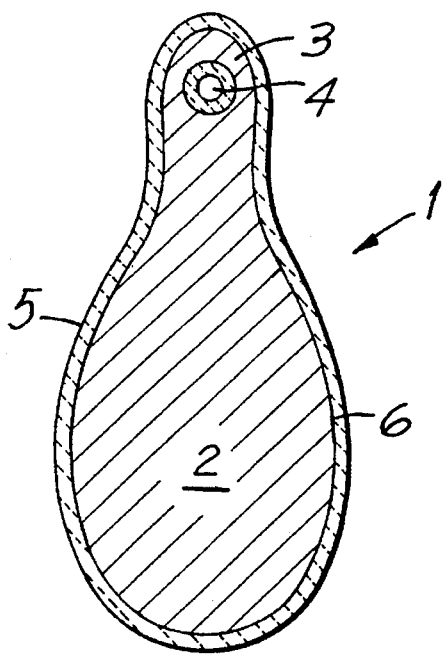
FIG. 2 is a sectional view taken along line 2—2 of FIG. 1.

In the drawings, the fishing weight 1 comprises a body portion 2 and a head portion 3 which is usually smaller than the body portion. The head portion 3 has an opening therein which is used to attach the fishing weight 1 to a fishing line (not shown) or some other similar article, such as a fishing net. In accordance with the present invention, the entire surface of the fishing weight 1 is coated with a coating 5 to protect the fishing weight 1 from disintegrating when it contacts salt water. As will be more fully described herein, the coating 5 is not only on the outer surface of the fishing weight 1, but also coats the opening 4. In short, the coating 5 covers and protects the entire exposed surface of the fishing weight.

The present invention entails the use of a zinc alloy to form the fishing weight 1. If a fishing weight made of zinc alloy is exposed to fresh water or salt water, there will be a galvanic reaction between the water and the zinc alloy, but there will be no toxic contamination. Unprotected (raw) zinc alloy will eventually be consumed because of the galvanic process between the zinc alloy and the water.

To prevent zinc alloy weight loss due to galvanic reaction or oxidation, the present invention provides for coating the entire surface of the zinc alloy fishing weight 1 with an environmentally safe and non-toxic powder paint coating 5. Should this protective coating 5 be damaged in usage, resulting in bare metal (zinc alloy) exposure, there will be no environmental or human endangerment as would be the case with lead fishing weights. The only adverse effect resulting from surface damage will be the eventual need to replace the zinc alloy fishing weight.

Zinc alloy (weight: 0.25 lbs./inch$^3$) is lighter than lead (weight: 0.25 lbs./inch$^3$). Hence, if a certain size lead fishing weight weighs 10 oz., for example, the same size zinc alloy fishing weight will weigh approximately 6 ozs.

The preferred material from which the fishing weight of the present invention is made is a zinc alloy Zamak #3 (ASTM No. AG40A). Its composition is approximately:

| | |
|---|---|
| aluminum | 3.5%–4.3% |
| magnesium | .02%–.05% |
| copper | .25% |
| iron | .10% |
| lead | .005% |
| cadmium | .004% |
| nickel | 0% |
| zinc | balance |

The zinc alloy metal is melted at approximately 800° F. and injected into a steel mold (not shown) under high pressure, e.g., over 1000 lb./in.$^2$ in any well known state of the art die casting machine. With the use of currently available, well-maintained equipment, up-to-date technology, highly skilled labor and close inspection, solid zinc alloy castings with excellent surface finish and minimum porosity may be obtained. As the castings are removed from the mold, they are quenched in a special solution (any well-known and existing solution) to prevent corrosion. They are then manually degated and prepared for finishing.

Since a zinc alloy diecast fishing weight will corrode when exposed to fresh or salt water spray or immersion, it is important that it be protected against such exposure. Powder coating has become a most widely-used and well-known method of protecting die cast parts against corrosion. In accordance with the present invention, a powder coating is applied as a coating 5 over the entire surface of zinc alloy fishing weight 1. The coating 5 should not only cover the outer surface 6 of the fishing weight, but should also cover the opening 4 in the head 3 of the fishing weight 1. The coating will not corrode in water.

The powder casting coating process is relatively simple and results in a coating 5 with an attractive finish with a wide range of colors and gives excellent protection against corrosion, scratches, chipping, and other hazards. The coating 5 is non-toxic. The thickness of the coating 5 can be easily controlled and varied to achieve the best protection. Preferably, the thickness of the coating 5 is between 1.5 and 1.7 mm. However, it will be understood that the thickness of the coating 5 may be changed without departing from the invention. After a thorough cleansing, the zinc alloy fishing weights 1 are electrostatically covered with the powered coating 5 to the predetermined thickness as set forth above. The coated zinc alloy fishing weights 1 are then conveyed through a curing oven (not shown) where they are cured (baked) at a temperature of about 375° to 400° F. for a scheduled period of between about 15 and 25 minutes. This results in a hard, durable, tough, and resilient coating 5 which is non-toxic and may be made in a full range of colors and with an appearance ranging from matte to glossy.

Various powder coatings may be used to accomplish the result of the present invention. Powder coatings made by Beckers Powders, Inc. and sold under the tradename Beckers have given excellent results. Excellent results have also be achieved by powder coatings sold by Ferro Corporation under the tradename Vedoc. However, as indicated above, other powder coatings may also be used in order to accomplish the same results.

While the invention has been described in connection with the use of a powdered coating 5, described above, it will be understood that the coating 5 may be any well-known coating and may be applied to the fishing weight 1 in any well-known manner.

With this construction, the coating 5 will protect the zinc alloy fishing weight 1 from being consumed. If this coating 5 should crack, chip or break when in use, the zinc alloy from which the fishing weight 1 is made will be consumed, but will not contaminate the environment.

It will be seen that the present invention provides an improved fishing weight which poses no danger of lead contamination, is environmentally safe, may be easily coated with a protective coating, and which will not violate the environment even if its coating is chipped or cracked.

As many and varied modifications of the subject matter of this invention will become apparent to those skilled in the art from the detailed description given hereinabove, it will be understood that the present invention is limited only as provided in the claims appended hereto.

What is claimed is:

1. A solid, non-hollow fishing weight, said fishing weight having a body portion, said body portion having a solid interior and an outer surface, the body portion having a central axis, the solid interior extending outwardly from said central axis, the exterior of said fishing weight being substantially symmetrical and being substantially devoid of any interruptions, the solid interior of said body portion being formed from a zinc alloy and having a protective coating covering the entire outer surface, said coating being non-corrosive when exposed to water, said protective coating being a powder coating having a thickness of between approximately 1.5 and 1.7 mm which has been electrostatically applied to the outer surface.

2. A fishing weight as set forth in claim 1 wherein the body portion has a neck portion extending therefrom said neck portion having an opening and wherein the protective coating is contiguous and covers the entire surface of the body portion and the head portion including the surface of said opening.

3. A fishing weight as set forth in claim 2 wherein said zinc alloy has approximately the following composition: aluminum 3.5%–4.3%; magnesium 0.02%–0.05%; copper 0.25%; iron 0.10%; lead 0.005%; cadmium 0.004%; nickel 0% zinc balance.

* * * * *